UNITED STATES PATENT OFFICE 2,558,211

PREPARATION OF 4-HYDROXYQUINOLINE COMPOUNDS

Robert C. Elderfield, Hastings on Hudson, and Allison D. Maggiolo, New Hyde Park, N. Y., assignors to Eli Lilly and Company, Indianapolis, Ind., a corporation of Indiana No Drawing. Application April 14, 1949, Serial No. 87,566

6 Claims. (Cl. 260—289)

Our invention relates to chemical processes and more particularly to the preparation of 4-hydroxyquinoline compounds.

The preparation of 4-hydroxyquinoline compounds has in the past been difficult of accomplishment. Quinoline compounds of this nature have been especially desirable to obtain in view of the therapeutic properties possessed by many quinolines, and the exceptional suitability of 4-hydroxyquinoline compounds as intermediates in the synthesis of therapeutically useful quinolines.

We have discovered that 4-hydroxyquinoline and substituted 4-hydroxyquinolines, generically referred to herein as 4-hydroxyquinoline compounds, are obtainable by dehydrogenation of the corresponding 4 - keto - 1,2,3,4 - tetrahydroquinoline compounds. The dehydrogenation is accomplished by reacting the ketotetrahydroquinoline compound with palladium in the presence of a hydrogen acceptor.

As is well recognized in the art, keto compounds possess the ability to exist in tautomeric forms known as "keto" and "enol" forms. Thus for example, 4-keto-1,2,3,4-tetrahydroquinoline in its "keto" form is represented by the following formula

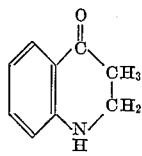

and in its "enol" form is represented by the following formula

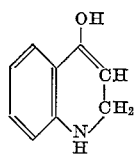

For the purpose of this invention the "keto" and "enol" tautomeric forms are equivalent, and to avoid the confusion which might arise by applying alternative nomenclature to what is in effect the same tetrahydroquinoline compound, this specification and the accompanying claims will refer only to the 4-keto-1,2,3,4-tetrahydroquinoline compounds.

Our process of dehydrogenation is simply and efficiently carried out by heating an aqueous mixture of the ketotetrahydroquinoline compound, palladium black catalyst and a hydrogen acceptor. The 4-hydroxyquinoline compound which is produced is isolated in any convenient manner, for example, by extraction with a water-immiscible solvent, or by making the aqueous mixture strongly alkaline to dissolve the 4-hydroxyquinoline compound, filtering the solution to remove the palladium catalyst and slightly acidifying the solution to precipitate the 4-hydroxyquinoline compound. The 4-hydroxyquinoline compound thus isolated is purified by methods known to the art, for example, by recrystallization.

4-ketotetrahydroquinoline and a wide variety of its substitution products which are used as starting materials in our process are known to the art, and methods for their preparation have been described in the scientific literature.

The palladium black catalyst used in the processes of our invention may be one of the several varieties of palladium black catalysts commercially available. In carrying out our reaction, we can use palladium black catalyst alone, palladium black supported on a carrier base, e. g. palladium black on carbon, barium sulfate, etc., or mixtures of supported and unsupported palladium black. The amount of catalyst used in the reaction is not critical. Illustratively, the amount of catalyst used will usually be an amount by weight of from $\frac{1}{2}$ to $\frac{1}{20}$ of the weight of the tetrahydroquinoline compound being dehydrogenated. However, these amounts are illustrative only and greater or lesser quantities may be employed. Preferred quantities of catalyst are within the range of $\frac{1}{10}$ to $\frac{1}{5}$ of the weight of the amount of the tetrahydroquinoline being dehydrogenated. Since the catalyst is recovered from each reaction mixture and may be used repeatedly, there is no disadvantage in the use of relatively large amounts for the dehydrogenation.

The hydrogen acceptor which functions in our reaction by accepting or taking up the hydrogen which is released from the tetrahydroquinoline compound may be any one of a number of easily hydrogenated compounds, i. e. compounds which contain active unsaturations. Preferably the acceptor is a compound which has appreciable water solubility and which is easily separated from the 4-hydroxyquinoline compound formed in the reaction, but such properties although desirable, are not essential. Many compounds are suitable hydrogen acceptors, these including compounds containing activated carbon-carbon unsaturations such as are found in maleic acid and fumaric acid or their readily hydrolyzable anhydrides, or easily reducible aromatic nitro compounds such as nitrobenzene and the like. Numerous additional compounds will readily be apparent to those skilled in the art. The amount of hydrogen acceptor employed, desirably is of course, an amount sufficient to take up all of the hydrogen which is removed from the 4-ketotetrahydroquinoline compound. For example, when maleic acid is the acceptor, about equimolecular amounts of maleic acid and 4-ketotetrahydroquinoline compound are employed. There is no particular advantage to be gained by the use of larger amounts of acceptor.

The aqueous medium in which our reaction is carried out can be water or water to which has been added an amount of a water-miscible solvent of the type which aids the solubility of the tetrahydroquinoline compound and the hydrogen acceptor. Suitable water-miscible organic solvents are alcohols, glycols and the like. As will be understood, the solubilizing organic solvent should be one which will not interfere with the reaction, and many solvents having the desired characteristics are readily available.

In carrying out our reaction, the aqueous reaction mixture ordinarily can be neutral or slightly alkaline. It is desirable, however, to employ a slightly alkaline reaction medium when a 4-ketotetrahydroquinoline compound which is substituted in the 2-position is being dehydrogenated. For example, when 4-ketotetrahydroquinaldine is dehydrogenated, a slightly alkaline reaction mixture (i. e. pH 9) is employed and the reaction period is extended. Substituted tetrahydroquinaldine compounds are dehydrogenated under similar conditions.

The following specific examples further illustrate our invention.

EXAMPLE 1

*Preparation of 4-hydroxy-6-chloroquinoline*

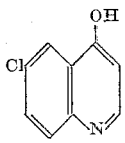

A mixture of 2 g. of 4-keto-6-chloro-1,2,3,4-tetrahydroquinoline, 2 g. of maleic acid, 0.2 g. of palladium black, 0.2 g. of 30 percent palladium on carbon and 30 ml. of water is refluxed for about 8 hours after which time the yellow color of the reaction mixture caused by the presence of the 4-keto-6-chloro-1,2,3,4-tetrahydroquinoline has substantially disappeared. The reaction mixture is cooled and made strongly alkaline with sodium hydroxide and filtered. The filtrate containing the 4-hydroxy-6-chloroquinoline is acidified to about pH 6 with acetic acid whereupon the 4-hydroxy-6-chloroquinoline precipitates. The precipitate is filtered off, dried and recrystallized from methanol, yielding 4-hydroxy-6-chloroquinoline melting at about 273–274° C. The yield is about 100 percent of theory.

The 4-keto-6-chloro-1,2,3,4-tetrahydroquinoline used in this example, and the other substituted 4-keto-1,2,3,4-tetrahydroquinoline and quinaldines described in the examples to follow, are prepared by procedures which follow in general the method described below for the preparation of 4-keto-6-chloro-1,2,3,4-tetrahydroquinoline.

10 g. of ethyl acrylate, 2.5 g. of glacial acetic acid and 12.8 g. of p-chloroaniline are heated at about 90° C. for about 16 hours. The reaction mixture is distilled under reduced pressure and the ethyl β-(p-chloroanilino)-propionate which distills at about 142° C. at 0.3 mm. pressure is recovered.

22.8 g. of the ethyl β-(p-chloroanilino)-propionate obtained by the above reaction is refluxed for about one half hour with a solution of 2 g. of sodium hydroxide in about 20 ml. of water. The β-(p-chloroanilino)-propionic acid obtained in the reaction mixture is isolated by acidifying the reaction mixture and filtering off the precipitated acid. After recrystallization from benzene the β-(p-chloroanilino)-propionic acid melts at about 125° C. The yield is about 75 percent of theory.

β-(p-Chloroanilino)-propionic acid can also be prepared by heating a solution of 12.8 g. of p-chloroaniline and 7.2 g. of monomeric acrylic acid in about 50 ml. of benzene to just below the active boiling point of the solution for about 16 hours, and cooling the solution to about 10° to cause crystallization of the β-(p-chloroanilino)-propionic acid.

4.3 g. of β-(p-chloroanilino)-propionic acid is heated on a steam bath for about 3 hours in admixture with 4 g. of p-toluene sulfonyl chloride, 50 ml. of dry benzene and 10 ml. of dry pyridine. The precipitate of pyridine hydrochloride formed during the reaction is filtered off and washed with benzene. The combined benzene filtrate and washings are extracted with 10 percent hydrochloric acid to remove any remaining pyridine and washed with water to remove traces of acid. The benzene solution is then extracted with three 100 ml. portions of 2 percent potassium hydroxide solution to obtain a solution of the potassium salt of N-tosyl-β-(p-chloroanilino)-propionic acid. The aqueous solution is treated with decolorizing carbon and acidified to pH 3 with dilute hydrochloric acid. N-tosyl-(β-p-chloroanilino)-propionic acid precipitates from the solution on acidification and crystallizes after the solution is cooled in the refrigerator. The crystalline acid is separated by filtration and purified by dissolving it in potassium bicarbonate solution and precipitating it from solution by acid and by recrystallization from a mixture of ether and hexane. The purified acid melts at about 126–127° C. The yield is about 80 percent of theory.

To 35 g. of N-tosyl-β-(p-chloroanilino)-propionic acid prepared as described above are added 100 ml. of phosphorous oxychloride and the mixture is warmed on a steam bath for about 25 minutes. The excess phosphorous oxychloride is removed in vacuo and 200 ml. of water are added to the residual oil. The aqueous mixture is made basic by the addition of 20 percent sodium hydroxide solution and the gummy, alkali-insoluble material comprising 1-tosyl-4-keto-6-chloro-1,2,3,4-tetrahydroquinoline is thoroughly triturated in the alkaline mixture. The alkaline aqueous solution is decanted and the residual, gummy tosyl derivative is refluxed for about 4 hours with a mixture of 25 ml. of hydrochloric acid and 25 ml. of acetic acid. The reaction mixture is evaporated to dryness under reduced pressure and the residue is made alkaline with 10 percent sodium hydroxide solution. The alkaline mixture is extracted with benzene and the benzene solution in which the 4-keto-6-chloro-1,2,3,4-tetrahydroquinoline dissolves, is extracted with three 50 ml. portions of hydrochloric acid. The combined extracts are made alkaline with potassium hydroxide whereupon a yellow precipitate of 4-keto-6- chloro-1,2,3,4-tetrahydroquinoline is obtained. After recrystallization from the ether-hexane mixture the 4-keto-6-chloro-1,2,3,4-tetrahydroquinoline melts at about 112° C. The yield is about 50 percent of theory.

EXAMPLE 2

*Preparation of 4-hydroxy-6-methoxyquinoline*

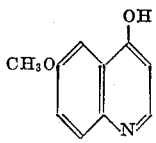

A mixture of 3 g. of 4-keto-6-methoxy-1,2,3,4-tetrahydroquinoline, 3 g. of fumaric acid, 0.3 g. of palladium black and 40 cc. of water is refluxed for about 10 hours. At the end of this time the yellow color of the reaction mixture caused by the presence of the 4-keto-6-methoxy-1,2,3,4-tetrahydroquinoline has disappeared. The reaction mixture is cooled and made strongly alkaline with sodium hydroxide and filtered. The filtrate containing the 4-hydroxy-6-methoxyquinoline is acidified to about pH 6 with acetic acid, whereupon the 4-hydroxy-6-methoxyquinoline precipitates. The precipitate is filtered off, dried, and recrystallized from methanol, yielding 4-hydroxy-6-methoxyquinoline in about 95 percent of theory. After recrystallization from methanol the 4-hydroxy-6-methoxyquinoline melts at about 239° C.

EXAMPLE 3

*Preparation of 4-hydroxy-6-methoxyquinoline*

4-hydroxy-6-methoxyquinoline is also prepared by the procedure described in Example 2, except that an equal weight of nitrobenzene is used as the acceptor in place of the fumaric acid.

EXAMPLE 4

*Preparation of 4-hydroxy-7-methylquinoline*

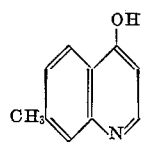

4-hydroxy-7-methylquinoline is prepared according to the procedure of Example 1 except that instead of using water in the reaction mixture equal volumes of water and alcohol are employed and the reaction mixture is refluxed for about 8 hours. 4-hydroxy-7-methylquinoline melts at about 233° C.

EXAMPLE 5

*Preparation of 4-hydroxy-8-methylquinoline*

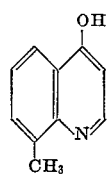

4-hydroxy-8-methylquinoline is prepared by substantially the same procedure described in Example 4 for the preparation of 4-hydroxy-7-methylquinoline except that nitrobenzene is used as the hydrogen acceptor.

EXAMPLE 6

*Preparation of 4-hydroxy-7-chloroquinoline*

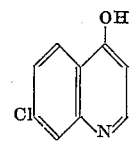

4-hydroxy-7-chloroquinoline is prepared from 4-keto-1,2,3,4-tetrahydroquinoline by substantially the same procedure used for the preparation of 4-hydroxy-6-chloroquinoline described in Example 1. 4-hydroxy-7-chloroquinoline melts at about 272° C. It is obtained in a yield of about 95 percent of theory.

EXAMPLE 7

*Preparation of 4-hydroxy-5-chloroquinoline*

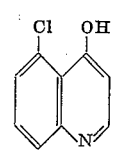

A mixture of 2 g. of 4-keto-5-chloro-1,2,3,4-tetrahydroquinoline, 0.2 g. of palladium black, 0.2 g. of 30 percent palladium on barium sulfate, 2 g. of maleic acid and 50 ml. of 50 percent aqueous acetone is refluxed for about 10 hours. An additional amount of acetone is added to the reaction mixture to cause solution of the 4-hydroxy-5-chloroquinoline obtained in the reaction, and the mixture is filtered to remove the palladium catalyst. The filtrate is evaporated under reduced pressure to remove substantially all of the acetone and to precipitate the 4-hydroxy-5-chloroquinoline. The 4-hydroxy-5-chloroquinoline is separated by filtration and purified by recrystallization from methanol, yielding 4-hydroxy-5-chloroquinoline melting at about 256° C.

EXAMPLE 8

*Preparation of 4-hydroxy-6-methoxy-7-chloroquinoline*

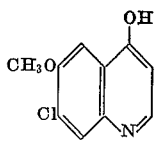

4-hydroxy-6-methoxy-7-chloroquinoline is prepared from 4-keto-6-methoxy-7-chloro-1,2,3,4-tetrahydroquinoline substantially according to the procedure described for the preparation of 4-hydroxy-6-chloroquinoline described in Example 1. 4-hydroxy-6-methoxy-7-chloroquinoline, after recrystallization from dilute, aqueous alcohol, melts at about 240° C.

The 4-keto-6-methoxy-7-chloro-1,2,3,4 - tetrahydroquinoline is obtained from 3-chloro-p-anisidine by the procedure of preparing tetrahydroquinoline compounds described in Example 1.

EXAMPLE 9

*Preparation of 4-hydroxy-6-chloroquinaldine*

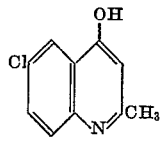

A mixture of 2 g. of 4-keto-6-chloro-1,2,3,4-tetrahydroquinaldine, 2 g. of maleic acid, 4 g. of anhydrous potassium carbonate, 0.2 g. of palladium black, 0.2 g. of 30 percent palladium on carbon, and 30 ml. of water is refluxed for 24 hours. The cooled solution is made strongly alkaline with sodium hydroxide and the catalyst filtered off. The filtrate is acidified to about pH 6 with acetic acid, whereupon 4-hydroxy-6-chloroquinaldine precipitates. The 4-hydroxy-6-chloroquinaldine, after recrystallization from methanol, melts at about 321–323° C. (dec.). The yield is about 95 percent of theory.

EXAMPLE 10

*Preparation of 4-hydroxy-5-methoxy-7-chloroquinoline*

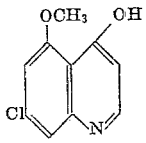

4-hydroxy-5-methoxy-7-chloroquinoline is prepared from 4-keto-5-methoxy-7-chloro-1,2,3,4-tetrahydroquinoline substantially according to the procedure described in Example 1 for the preparation of 4-hydroxy-6-chloroquinoline. 4-hydroxy-5-methoxy-7-chloroquinoline melts with decomposition at about 247° C.

EXAMPLE 11

*Preparation of 4-hydroxyquinaldine*

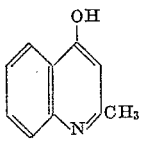

4-hydroxyquinaldine is prepared from 4-keto-1,2,3,4-tetrahydroquinaldine by the procedure described in Example 9. The 4-hydroxyquinaldine melts at about 230° C.

We claim:

1. The process of preparing a 4-hydroxyquinoline compound which comprises dehydrogenating a 4-keto-1,2,3,4-tetrahydroquinoline compound by heating the tetrahydroquinoline compound with palladium black and a hydrogen acceptor of the group consisting of maleic acid, fumaric acid and nitrobenzene, and isolating the 4-hydroxyquinoline compound.

2. The process of dehydrogenating a 4-keto-1,2,3,4-tetrahydroquinoline compound which comprises heating an aqueous mixture of the tetrahydroquinoline compound, palladium black, and a hydrogen acceptor of the class consisting of maleic acid, fumaric acid and nitrobenzene, and isolating the 4-hydroxyquinoline compound.

3. The process of preparing a 4-hydroxyquinoline compound which comprises dehydrogenating a 4-keto-1,2,3,4-tetrahydroquinoline compound by heating an aqueous mixture of the tetrahydroquinoline compound, palladium black and a hydrogen acceptor of the class consisting of maleic acid, fumaric acid and nitrobenzene, and isolating the 4-hydroxyquinoline compound.

4. In the process of preparing a 4-hydroxyquinoline compound, the step which comprises heating a 4-keto-1,2,3,4-tetrahydroquinoline compound with palladium black and a hydrogen acceptor of the class consisting of maleic acid, fumaric acid and nitrobenzene.

5. The process according to claim 3 in which the hydrogen acceptor is maleic acid.

6. The process according to claim 3 in which the hydrogen acceptor is fumaric acid.

ROBERT C. ELDERFIELD.
ALLISON D. MAGGIOLO.

REFERENCES CITED

The following references are of record in the file of this patent:

Clemo et al.: J. Chem. Soc. (London), vol. 125, pp. 1608–1622 (1924).

Wiselogle: Survey of Antimalarial Drugs, 1941–1945 (J. W. Edwards, Ann Arbor, Mich., 1946), vol. II, page 1048.

Ramsey et al.: J. Am. Chem. Soc., vol. 69, page 1660 (1947).

Lindemann: Helv. Chim. acta, vol. 32, pp. 69–76 (Jan., 1949).